(12) United States Patent
Kim (10) Patent No.: US 8,849,662 B2
(45) Date of Patent: Sep. 30, 2014

(54) METHOD AND SYSTEM FOR SEGMENTING PHONEMES FROM VOICE SIGNALS

(75) Inventor: Hyun-Soo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 2555 days.

(21) Appl. No.: 11/646,911

(22) Filed: Dec. 28, 2006

(65) Prior Publication Data
US 2007/0150277 A1 Jun. 28, 2007

(30) Foreign Application Priority Data
Dec. 28, 2005 (KR) .................. 10-2005-0131964

(51) Int. Cl.
  *G10L 15/02* (2006.01)
  *G10L 15/00* (2013.01)
  *G10L 15/06* (2013.01)
  *G10L 17/00* (2013.01)
  *G10L 15/04* (2013.01)

(52) U.S. Cl.
  CPC ...................................... *G10L 15/04* (2013.01)
  USPC ........................... 704/243; 704/231; 704/254

(58) Field of Classification Search
  USPC ........... 704/1, 7, 10, 231, 233–234, 243–251, 704/254, 276, E17.001–E17.011, 704/E15.001–E15.002, E15.004–E15.009, 704/E15.014–E15.016, E15.02–E15.026, 704/E11.001–E11.007
  See application file for complete search history.

(56) References Cited

U.S. PATENT DOCUMENTS

| | | | | |
|---|---|---|---|---|
| 4,227,177 A | * | 10/1980 | Moshier | 704/231 |
| 4,481,593 A | * | 11/1984 | Bahler | 704/253 |
| 4,703,504 A | * | 10/1987 | Vittorelli | 704/254 |
| 4,975,959 A | * | 12/1990 | Benbassat | 704/240 |
| 5,033,087 A | * | 7/1991 | Bahl et al. | 704/256.5 |
| 5,136,653 A | * | 8/1992 | Kumagai et al. | 704/249 |
| 5,170,359 A | * | 12/1992 | Sax et al. | 702/73 |
| 5,208,897 A | * | 5/1993 | Hutchins | 704/200 |
| 5,679,001 A | * | 10/1997 | Russell et al. | 434/185 |
| 5,687,286 A | * | 11/1997 | Bar-Yam | 704/232 |
| 5,799,276 A | * | 8/1998 | Komissarchik et al. | 704/251 |
| 5,862,519 A | * | 1/1999 | Sharma et al. | 704/231 |
| 6,031,822 A | * | 2/2000 | Wallmeier | 370/235 |
| 6,260,016 B1 | * | 7/2001 | Holm et al. | 704/260 |
| 6,535,851 B1 | * | 3/2003 | Fanty et al. | 704/249 |
| 7,010,483 B2 | * | 3/2006 | Rajan | 704/228 |
| 7,054,810 B2 | * | 5/2006 | Gao et al. | 704/231 |
| 7,243,063 B2 | * | 7/2007 | Ramakrishnan et al. | 704/215 |
| 7,299,188 B2 | * | 11/2007 | Gupta et al. | 704/276 |
| 7,444,282 B2 | * | 10/2008 | Choo et al. | 704/202 |
| 2004/0172238 A1 | * | 9/2004 | Choo et al. | 704/202 |
| 2006/0212296 A1 | * | 9/2006 | Espy-Wilson et al. | 704/254 |
| 2007/0150277 A1 | * | 6/2007 | Kim | 704/254 |

FOREIGN PATENT DOCUMENTS

| | | |
|---|---|---|
| JP | 10093591 | 4/1998 |
| JP | 11-184497 | 7/1999 |
| KR | 1019980065481 | 10/1998 |
| KR | 1020010003502 | 1/2001 |

* cited by examiner

*Primary Examiner* — Pierre-Louis Desir
*Assistant Examiner* — David Kovacek
(74) *Attorney, Agent, or Firm* — The Farrell Law Firm, P.C.

(57) ABSTRACT

A method and a system for segmenting phonemes from voice signals. A method for accurately segmenting phonemes, in which a histogram showing a peak distribution corresponding to an order is formed by using a high order concept, and a boundary indicating a starting point and an ending point of each phoneme is determined by calculating a peak statistic based on the histogram. The phoneme segmentation method can remarkably reduce an amount of calculation, and has an advantage of being applied to sound signal systems which perform sound coding, sound recognition, sound synthesizing, sound reinforcement, etc.

4 Claims, 8 Drawing Sheets

METHOD AND SYSTEM FOR SEGMENTING PHONEMES FROM VOICE SIGNALS

PRIORITY

This application claims priority to an application filed with the Korean Intellectual Property Office on Dec. 28, 2005 and assigned Serial No. 2005-131964, the contents of which are incorporated herein by reference.

BACKGROUND OF THE INVENTION

1. Field of the Invention

The present invention relates to a method and a system for segmenting phonemes from voice signals, more particularly to a method and a system for segmenting phonemes from voice signals for a sound recognition system.

2. Description of the Related Art

Various techniques using voice signals have been applied to various systems including a voice recognition system. An important issue is how accurate the techniques detect a starting point and an ending point of voice signals when the voice signals are input, so as to input an accurate voice into a corresponding system.

In particular, a basic research for a method capable of dividing phonemes should be developed in order to recognize the voice signals. According to conventional methods, when a position of phonemes is identified so as to segment the phonemes, each segmented phoneme is classified and the content of the phoneme is identified. These methods are generally performed by complicated processes that typically include statistics and a combination of an extraction method for extracting various measurements.

These methods involve a large amount of calculation, and detect non-voice noise having a similar level to voice, as well as voice, so as to sensitize if noise is involved in the voice. In addition, since these methods involve a large amount of stochastic calculations according to a stochastic manner, the accuracy of calculation according to these methods may be reduced.

One of the most used methods among them is to combine and use cepstral-coefficients. However, this method implies an underlying limitation which a linear prediction method has.

Linear prediction methods, mainly used for voice signal analysis, are affected by an order of a linear prediction, where minimal improvements in calculation amounts and capability have been achieved. Such linear prediction methods can operate only under the assumption that there is no signal change for a short time and that vocal trace transfer function can be modeled by linear pole models.

Further, in linear prediction methods; a formant center frequency involves a large amount of calculation by a root calculation of a Linear Predictive Coding (LPC) polynomial, and weak peaks of a spectrum envelope occur when peaks are selected.

In addition, linear prediction methods apply a data windowing. When the data windowing is selected, it is difficult to detect the spectrum envelope if a balance between resolutions on a time axis and a frequency axis is not maintained. For example, in the case of voice having very high pitches, linear prediction methods follow individual harmonics because a distance between the harmonics is wide. Therefore, in the case of applying linear prediction methods to women or children, capability may be deteriorated.

In conventional methods, it is difficult to accurately detect the starting point and the ending point of phonemes. Further, conventional methods are inconvenient to use because of the great amount of calculation involved. Therefore, a need exists for a method for accurately defining the starting point and the ending point of phonemes and for simultaneously reducing the calculation.

SUMMARY OF THE INVENTION

Accordingly, the present invention has been made to solve the above-mentioned problems occurring in the prior art, and it is an object of the present invention to provide a method and a system for segmenting phonemes from voice signals, which can accurately perform phoneme segmentation in a sound recognition system.

In order to accomplish the object of the present invention, according to an aspect of the present invention, there is provided a method for segmenting phonemes from voice signals, which includes extracting peak information from input voice signals; calculating peak statistics per each frame based on the extracted peak information; determining maxima among the calculated peak statistics per each frame; and determining a valley between the maxima as a boundary between the phonemes to perform a phoneme segmentation.

In order to accomplish the object of the present invention, according to another aspect of the present invention, there is provided a system for segmenting phonemes from voice signals, which includes a peak information extractor for extracting peak information from input voice signals; a peak statistic calculator for calculating peak statistics per each frame based on the extracted peak information; and a boundary determination unit for determining maxima among the calculated peak statistics per each frame, and determining a valley between the maxima as a boundary between the phonemes in order to segment the phonemes.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

The present invention improves accuracy of segmenting phonemes from voice signals. To this end, the present invention is a method for accurately segmenting phonemes, in which a concept of a high order peak is employed so as to allow a generation of a histogram indicating a distribution of corresponding order peaks, and statistics of peaks can be calculated based on the histogram in order to determine boundaries defining a starting point and an ending point of each phoneme. Such a phoneme segment method can remarkably reduce an amount of calculation and has an advantage of being applicable for all kinds of sound signal systems which perform voice coding, voice recognition, voice synthesizing, voice reinforcement, etc.

Figure 1:
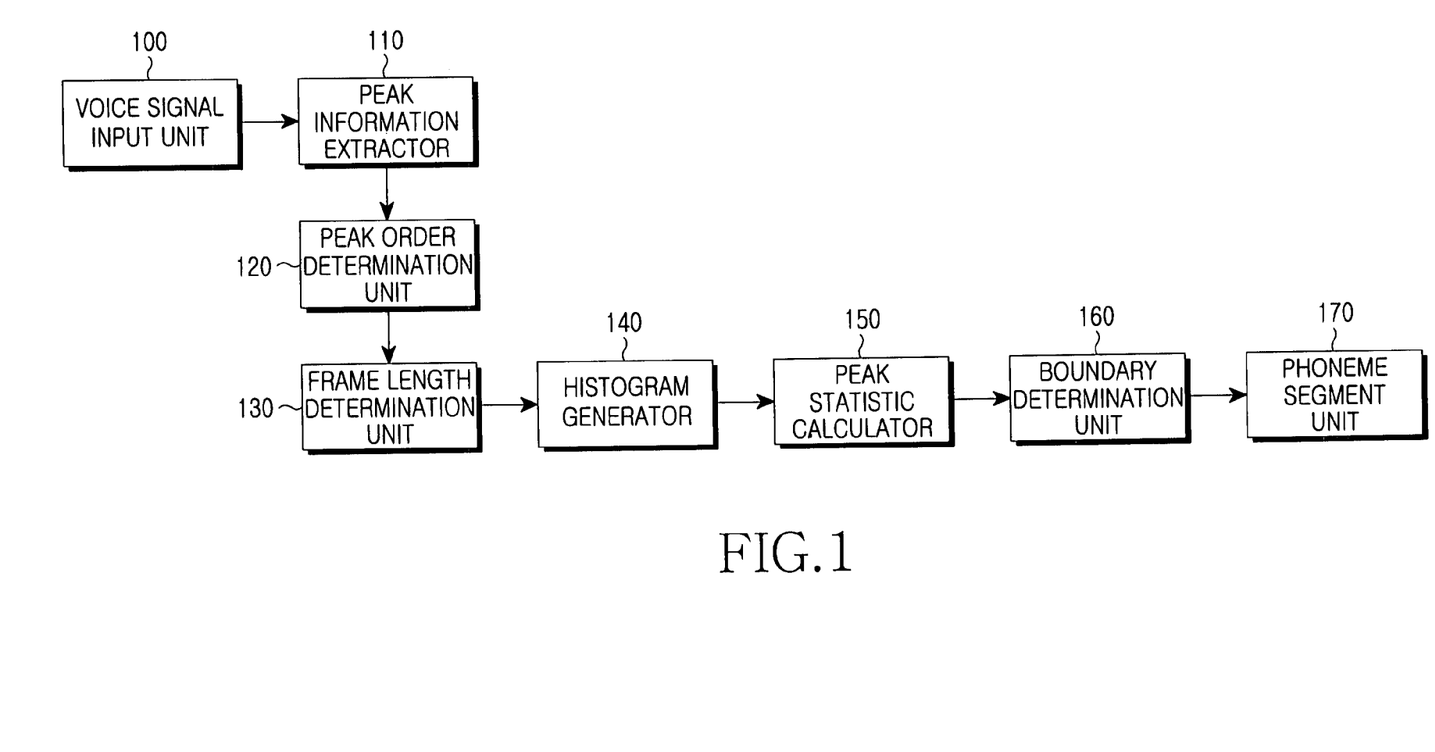
FIG. 1 is a block diagram of a system for segmenting phonemes according to the present invention.

FIG. 1 is a block diagram of the system for segmenting phonemes according to the present invention.

The phoneme segment system includes a voice signal input unit 100, a peak information extractor 110, a peak order determination unit 120, a frame length determination unit 130, a histogram generator 140, a peak statistic calculator 150, a boundary determination unit 160, and a phoneme segment unit 170.

The voice signal input unit receives voice signals including sound signals, and may include components such as a microphone, etc.

The peak information extractor 120 receives voice signals from the voice signal input unit 100, and extracts peak information from the voice signals. After primarily extracting the first peak information from the received signals, the peak information extractor 110 may extract information about each order peak using a theorem on a high order peak, in order to extract meaningful data.

The peak order determination unit 120 defines the order for each peak extracted by the peak information extractor 110, and compares a peak characteristic value in the current order with a threshold optimized according to a system, i.e. a predetermined critical peak characteristic value, to determine which degree of order of peak is used. A variance reduction of distribution may be used as a reference in the comparison. Once an $N^{th}$ order peak is used, it is unnecessary to extract peaks with an order higher than that of the used peak.

Figure 3:
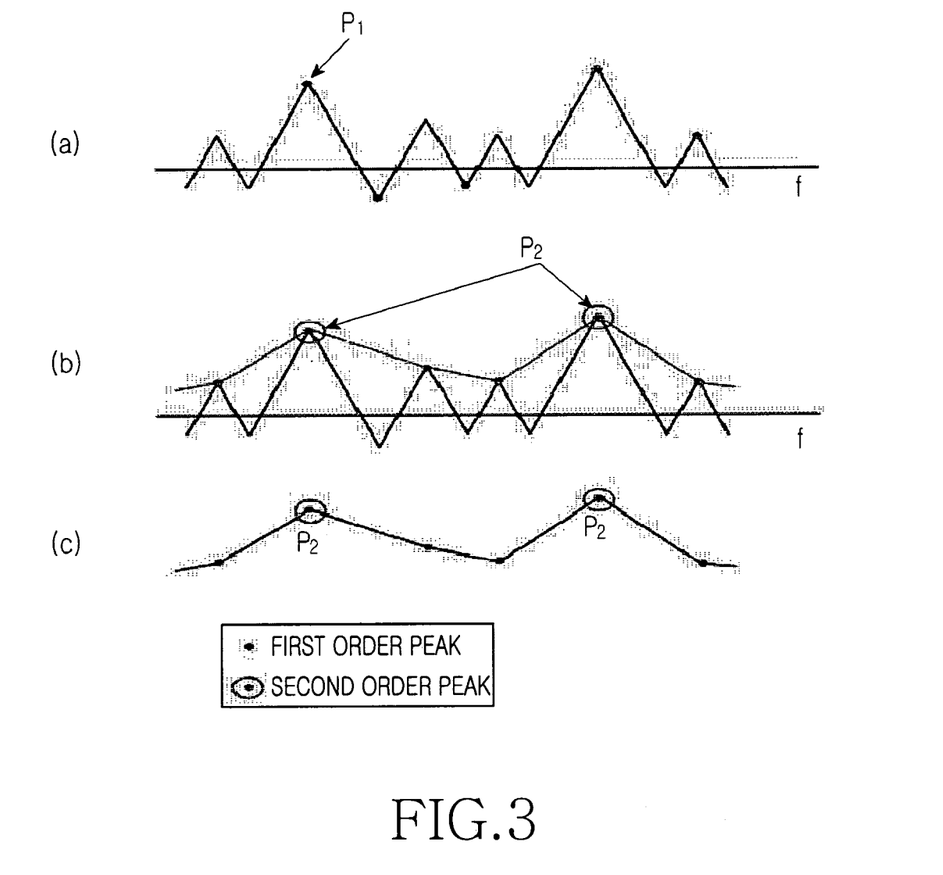
FIG. 3 are graphs illustrating the definition process of $N^{th}$ order peaks according to the present invention.

Briefly describing a high order peak according to the present invention, where a general peak is defined as a first order peak, the present invention defines the first order peaks as second order peaks, as shown in FIG. 3. Similarly, third order peaks are defined as second order peaks. The high order peak is defined using such a concept.

Thus, in order to find the second peak, the first order peaks are merely regarded as novel time series, so that the peak of the time series is found. In the same way, high order minima, i.e. valleys, can be also defined. Therefore, the second order valley becomes a local minima of time series of the first order valley.

These and high order peaks or valleys can be used as very effective statistics in the extraction of measurements of voice and audio signals. For example, the second peak and third peak among the order peaks have pitch information of the voice and audio signals. Further, the time or sampling points between the second peak and the third peak include information about the extraction of measurements of the voice signals. Thus, the peak order determination unit 120 preferably selects the second or third peak from every peak extracted by the peak information extractor 110.

It is possible to obtain a lot of information by analyzing peak characteristics of various orders on a time axis and a frequency axis. Useful measurements may be extracted from statistics obtained using a histogram analyzation, e.g. basic statistics such as mean deviation and standard deviation, and a proportion of a basic statistic. A periodicity measurement using them or a measurement for voiced sound are very useful information. A correct peak order should be found in order to extract the measurement.

Due to the characteristics of high order peaks proposed by the present invention, lower order peaks generally have low levels, while higher order peaks have low frequency. For example, the second peak has a higher level than that of the first peak, and the number of peaks is less than that of the first order peak.

The ratio of each order peak can be useful in order to extract measurements of voice and audio signals, and specifically the second and third peaks have information about pitch extraction information.

On the other hand, the rule relating to the high order peaks is as follows:
1. There may exist only one valley (or peak) existing between continuous peaks (or valleys).
2. The rule can be applied to each order peak (valley).
3. There is a small amount of high order peaks (valley) less than the low order peaks (valley), which exist in a subset region of the low order peak (valley).
4. At least one low order peak (valley) always exists between two continuous high order peaks (valley).
5. The high order peaks (valley) generally have a higher level than that of the low order peaks (valley).
6. An order having only one single peak and one valley (for example a maximum value and a minimum value) exists in a signal for a certain duration (for example in a frame).

According to the rule relating to the high order peaks, the peak order determination unit 120 defines peaks extracted by the peak information extractor 110 as first order peaks. Then, the peak order determination unit 120 identifies the standard deviation and the average value relating to the first order peaks, to select the current order when the periodicity is greater than the reference value. But, when the periodicity is smaller than the reference value, the peak order determination unit 120 increases order. Specifically, the peak order determination unit 120 determines which order is used by using the standard deviation and average value of each order. Here, the reference value is a threshold needed to minimize the system.

If only the first order peaks are used in the general system, the determination of the peak order can be omitted and the selection of the peak order is optionally set. However, the peak order determination unit 120 according to the present invention uses the second order peaks as a default.

As described above, when any one order is determined by the peak order determination unit 120, the frame length determination unit 130 determines the length of the frame which is applied during the calculation of peak statistics. The frame length determination unit 130 can use frames of 512 points as a default, and can vary as desired. As described above, when the length of the frame is determined, the histogram generator 140 updates each frame by one point and then performs slide and add calculations to generate a cumulative graph with respect to the order peak value determined by the peak order determination unit 120. Specifically, the histogram generator 140 generates a histogram relating peak distribution information indicating how many peaks per each frame are distributed. For example, according to the present invention, the histogram, a so-called bar graph, shows points indicating time on a transverse axis, on which bars are established to have a height in proportion to the peak distribution. The histogram becomes the reference by which it is possible to determine how much meaningful data, i.e. peak information, exists.

The peak statistic calculator 150 calculates peak statistics per frame based on extracted peak information in the case of using only the first peaks, while calculating peak statistics corresponding to the order using the histogram in the case of using peaks other than the first peaks. Here, the peak statistics are calculated by operation of average and standard deviation in the histogram. The peak statistic calculator 150 determines a statistic used as a critical value, which uses a first standard deviation as a default in the present invention. Here, the critical value is a value used for determining which portion of the peak statistic is regarded as phonemes, and specifically is a predetermined value in order to select the maximum value regarded as phonemes.

The boundary determination unit 160 determines the maxima among larger values than the critical value with reference to the threshold of the histogram determined by the peak statistic calculator 150, and determines low valley points, i.e. valleys between the maxima, as a boundary of a phoneme. When the boundary determination unit 160 determines the boundary of phonemes as described above, the phoneme segment unit 170 detects a starting point and an ending point of each phoneme depending on the boundary of the phoneme, so as to segment the phonemes.

In the phoneme segmentation system described above, the peak statistics are calculated using the distribution of the peak corresponding to the order, and it is possible to determine the valleys between the maxima obtained from the calculated peak statistics as the boundary between the phonemes. Then, the starting point and the ending point of the phonemes are detected by using the boundary of the phonemes, thereby performing the phoneme segmentation. According to the present invention, the phonemes of the voice signals can be segmented by the extraction of peak information on a time axis, thereby making it possible to remarkably reduce the calculation and to improve the accuracy of the boundary between the phonemes.

Figure 2:
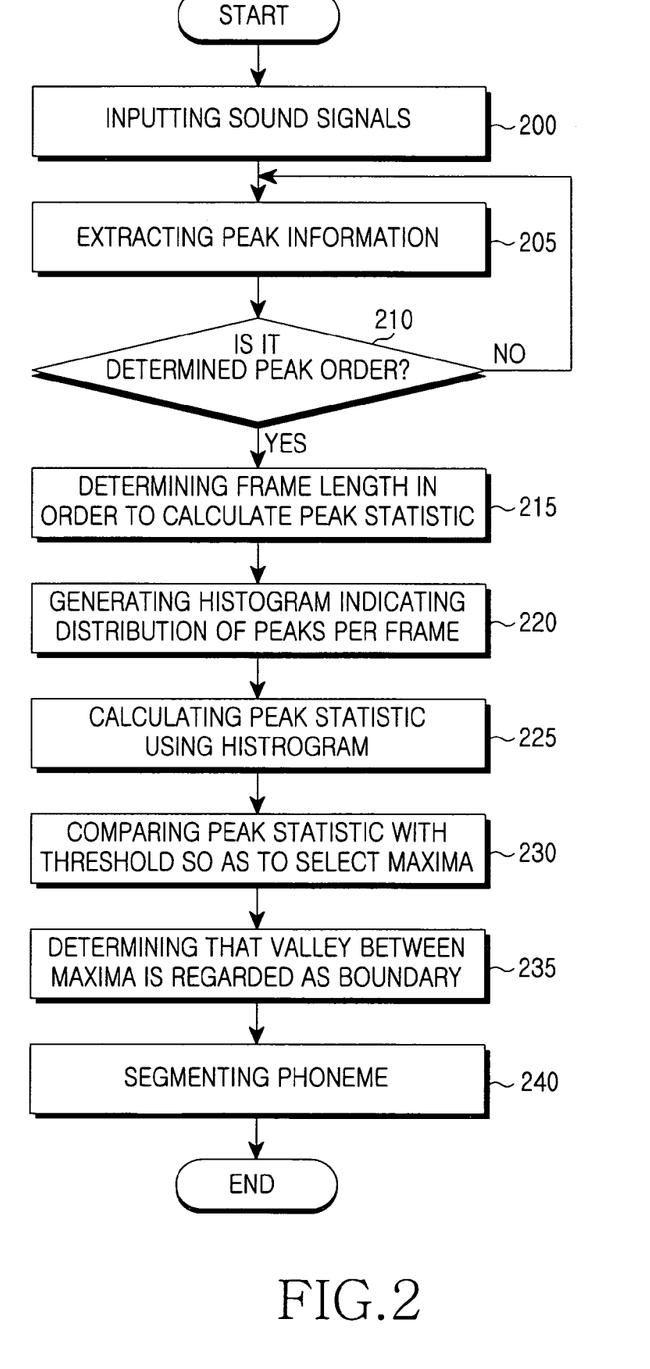
FIG. 2 is a flowchart showing the steps of processes for segmenting phonemes according to the present invention.

Hereinafter, the operation of the structural elements according to the present invention will be described in detail with reference to FIG. 2.

The phoneme segmentation system receives voice signals from a microphone, etc., at step 200, and primarily extracts first peak information at step 205. As the peaks are located over noise, the peaks have further stronger characteristics with respect to the noise than a zero crossing in which peaks are mixed with noises. Therefore, it is possible to apply the present invention to the peaks.

Next, the phoneme segmentation system compares the first peak information with an optimized threshold to determine which order peak is used. Here, the optimized threshold has different values for various systems using voice signals, and refers to a reference value for optimizing a particular system. Thus, the optimized threshold of the present invention is a value used for maintaining the best capability of the phoneme segmentation system. Such a threshold can be changed by repeated experiments.

Then, after the comparison of the first peak information with the optimized threshold, the phoneme segmentation system determines if the order of the peak is decided, at step 210. If the present first peak information does not satisfy the threshold, the phoneme segmentation system returns to step 205 to define a high peak between the first peaks as a second peak. Specifically, the peaks among the first peaks, which are sequentially shown in time series according to time, are defined as second peaks.

The present invention defines novel peaks extracted from the signals of the first peaks to the second peaks, as shown in FIG. 3.

FIG. 3 are diagrams illustrating the definition process of $N^{th}$ order peaks according the present invention. Diagram (a) of FIG. 3 is a graph illustrating the first peaks $P_1$. The peak determination unit 120 defines each peak extracted by the peak information extractor 110 as first peak $P_1$, which corresponds to each peak shown in diagram (a). Then, the peak determination unit 120 detects the peaks $P_2$ to be obtained by connecting the first peaks $P_1$, as shown in diagram (b) of FIG. 3. Next, the detected peaks are defined as second peaks $P_2$, as shown in diagram (c) of FIG. 3.

FIG. 3 shows the peaks corresponding to each order, which are necessary for extracting meaningful data from voice signals in the time domain. Referring to diagram (a), the peaks indicated by $P_1$ are shown in a region in which the characteristic of the signal is suddenly changed. The region in which the characteristics of the signal are changed includes portions between voiced sound and voiceless sound and between a starting point and an ending point of the voice signal, i.e. between words.

A transverse axis of the graphs in FIG. 3 represent a potential value, while a longitudinal axis of the graphs indicates a height. It is possible to determine which order peak is used when the distribution and the average value with respect to the height value relate to each order peak in FIG. 3 illustrating the concept of high order peak. Generally, the distribution indicates the potential value, while the average value is calculated by using the height value. A voiced sound has the characteristics in which the distribution is relatively low and the average value is relatively high, as compared with the voiceless sound. The voiceless sound has the reverse characteristics with respect to the voiced sound. Typically, the sound without non-periodicity has high distribution.

On the other hand, since the starting point and the ending point of a voice signal has the same characteristics as described above, the peak order determination unit 120 can determine if the present order peak information has high or low periodicity, based on the peak information provided by the peak information extractor 110, so as to decide which order can be used. Specifically, the peak order determination unit 120 defines high order when the periodicity in the present order is lower than the reference value.

Figure 4:
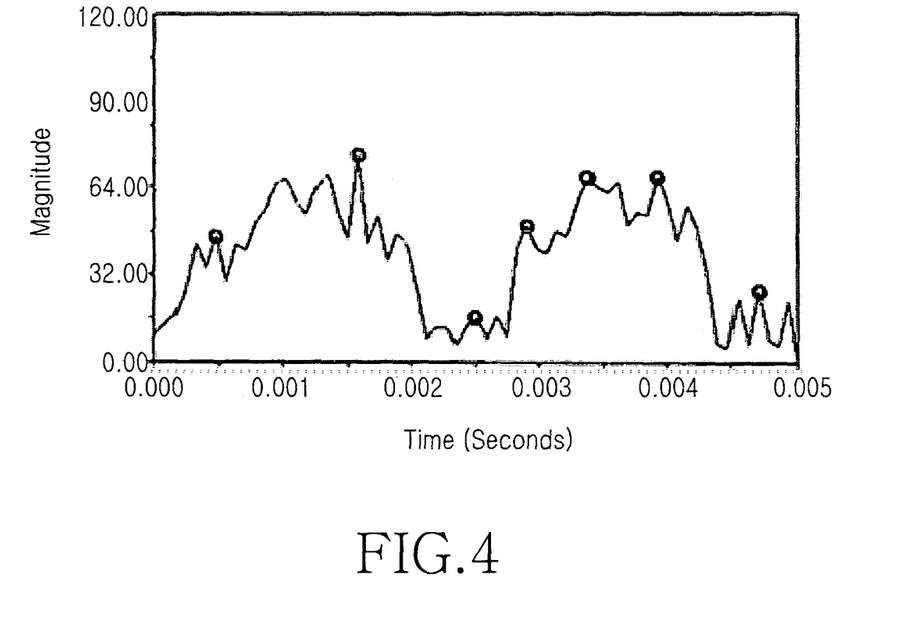
FIG. 4 is a graph illustrating the definition process of a second order peak according to the present invention.

Meanwhile, the peak order determination unit 120 uses the second peak as a default value. FIG. 4 is a graph illustrating the second order peak selected according to of the present invention, where sinusoidal signals of 200 Hz in Gaussian noises are shown. Portions marked by circles in a signal waveform are the selected second peaks.

Figure 5:
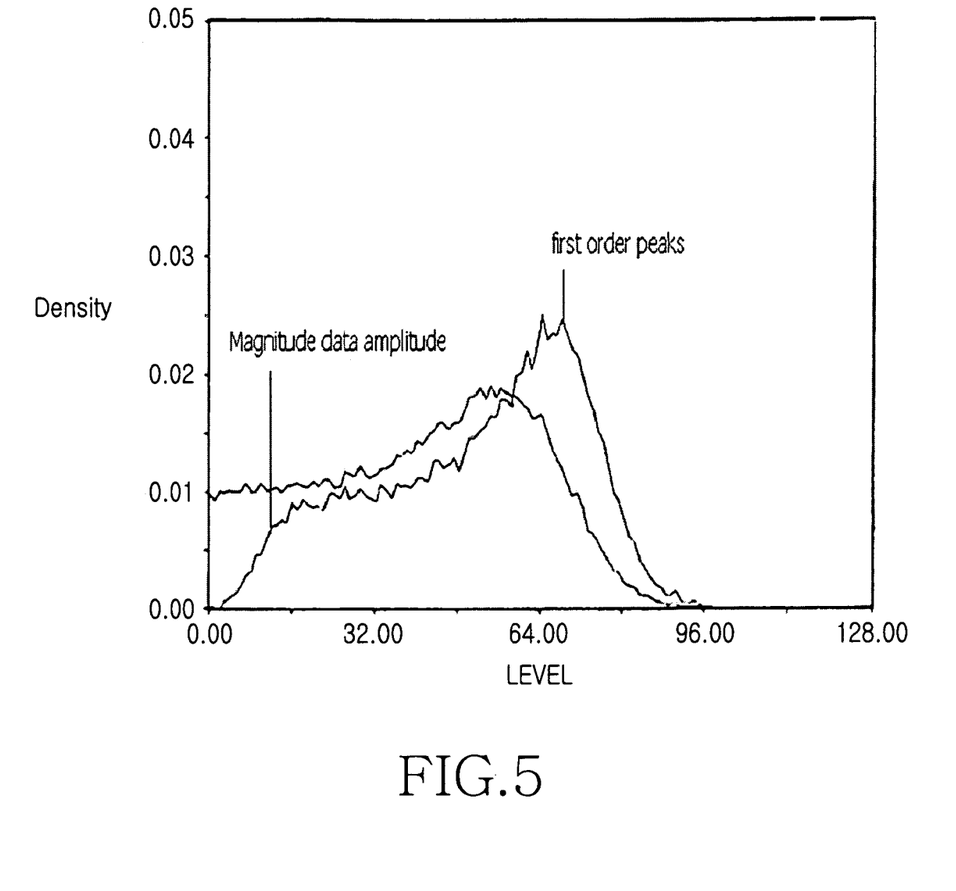
FIGS. 5 to 7 are graphs illustrating the generation of histogram according to the present invention.
Figure 6:
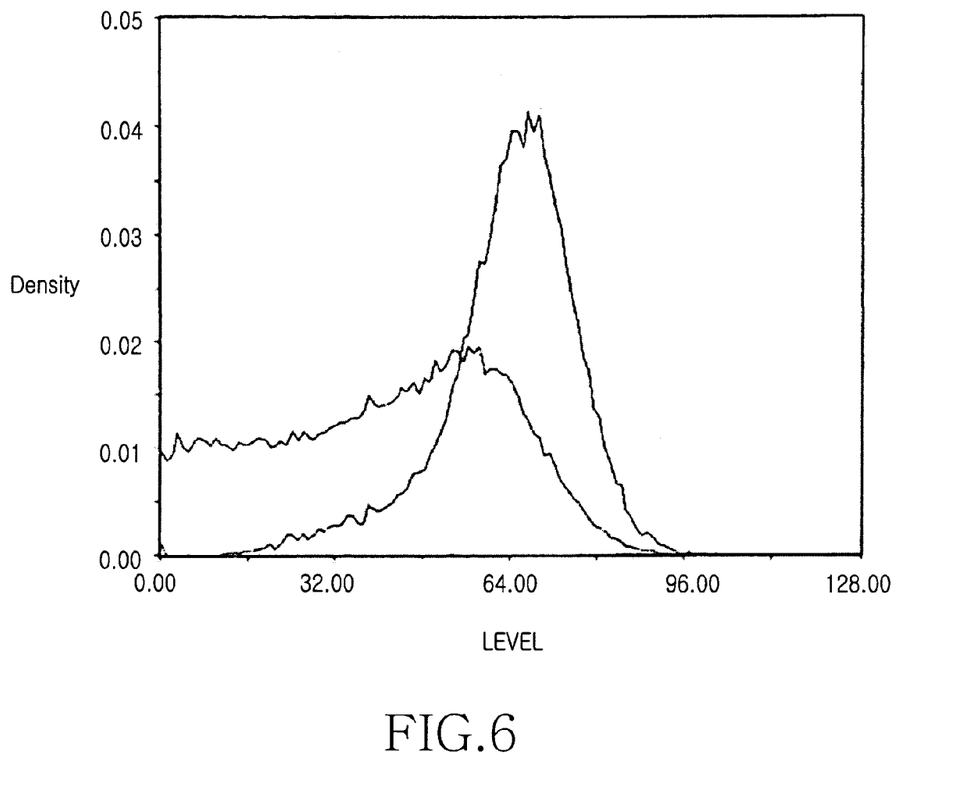
Figure 7:
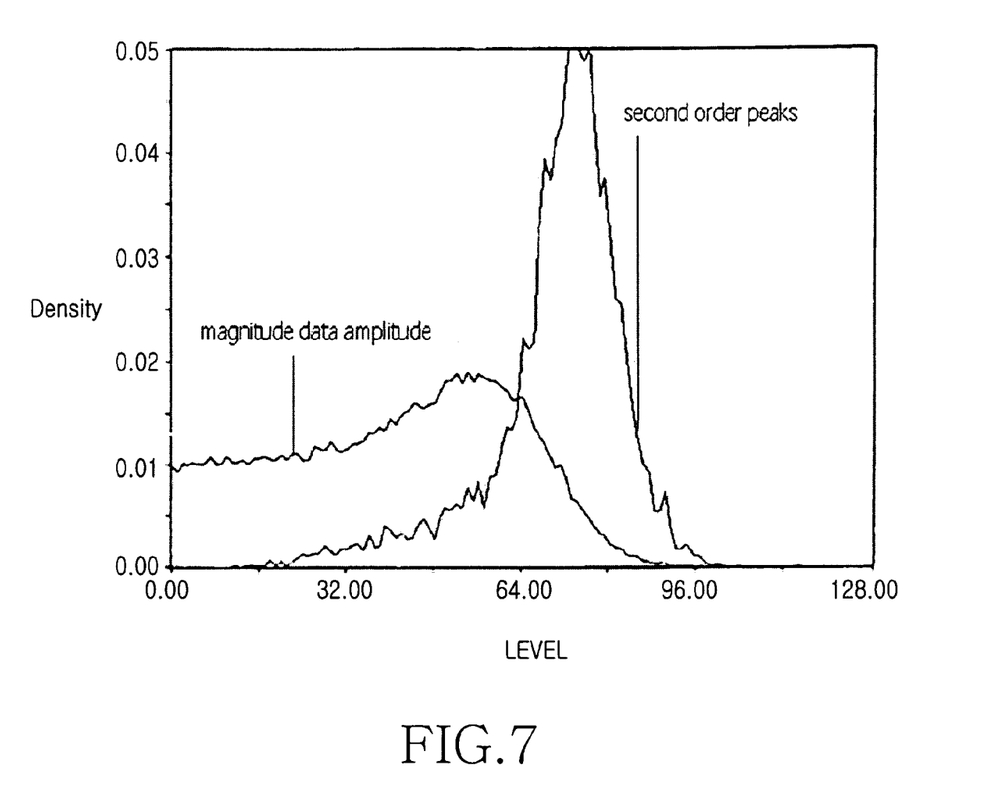

When the order of the peak is determined at step 210, the phoneme segmentation system progresses to step 215 to determine a length of the frame in order to calculate the peak statistic. Then, the phoneme segmentation system forms a histogram showing the distribution per each frame of the peaks at step 220. The form of the histogram can be achieved by updating the peak of each frame by one point in the phoneme segmentation system and then obtaining an accumulated graph with respect to the peak value of the order determined by slide and add calculations. FIGS. 5 to 7 illustrate signal outputs output by a histogram forming method according to the present invention. FIG. 5 shows a magnitude of a sine wave plus noise of 200 Hz, and a histogram for the first order peak. FIG. 6 shows a magnitude of a sine wave plus noise of 800 Hz, and a histogram for the first peak. FIG. 7 shows a magnitude of a sine wave plus noise of 200 Hz, and a histogram for the second peak.

Next, the phoneme segmentation system calculates a peak statistic using the histogram at step 225, and compares the calculated peak statistic with the critical value predetermined by the peak statistic calculator 150 to select the maxima. Specifically, it is possible to obtain the maxima from larger portions than the critical value in the histogram. At this time, an apex may be the maximum value when a gradient before and after the present sampling unit among the larger portions than the critical value is greater than the predetermined gradient. In the present invention, the values corresponding to the portions 20% more than actual circumstance can be selected as the maxima in order to obtain more accurate maxima.

Then, the phoneme segmentation system determines a low valley between the maxima as the boundary of the phonemes at step 235, and detects the starting point and the ending point based on the boundary of the phonemes so as to perform the phoneme segmentation at step 240.

In the present invention, the analysis of the histogram is performed by extracting the peak information on the time axis, and it is possible to detect the starting point and the ending point of the phonemes so as to perform the phoneme segmentation. Furthermore, it is possible to calculate a stochastic length with respect to each phoneme using the statistic values for the peak information of each order, i.e. the mean deviation and the standard deviation, thereby identifying what each segmented phoneme is.

In the performance of the phoneme segmentation as described above, it is the important to determine where a boundary is defined between phonemes. In the present invention, by combining the peak information on the time axis, for example the peak frequency information and the peak amplitude information, it is possible to obtain the segmentation statistics in order to improve accuracy with which an underlying phonetic structure of a word is determined. This corresponds to the first segmentation stage before the division of the phonemes.

Figure 8:
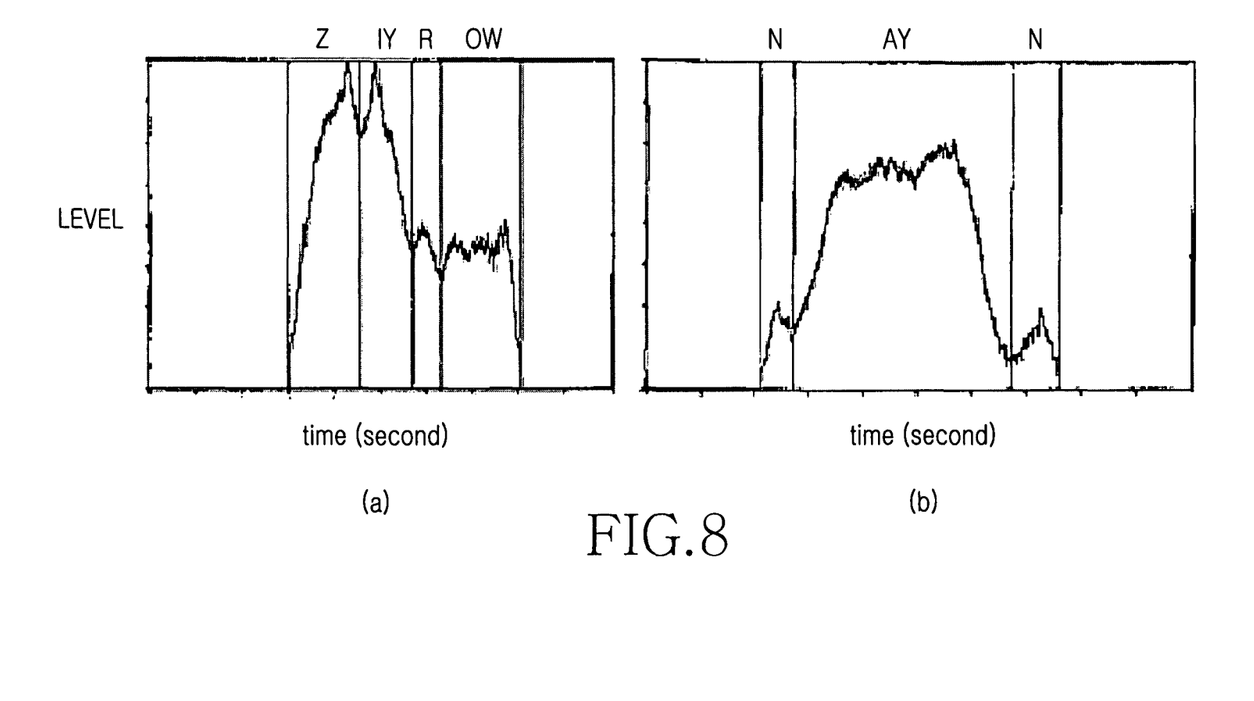
FIG. 8 is a graph illustrating the segmentation of phonemes using peak information according to the present invention.

FIG. 8 is a graph illustrating the segmentation of phonemes using peak information according to the present invention, in which the segmentation of the phonemes is applied to words 'zero' and 'nine'.

Although the phoneme segmentation which has a greater value than the critical value needed for determination of the maxima admitted as the phonemes, and which is performed based on the generation frequency with respect to the first peak information is illustrated in FIG. 8, this is only for illustration and the peak measurement information applicable to the present invention is not limited to this. Specifically, the peak measurement information used to segment the phonemes according to the present invention is determined by the frequency and magnitude of the voice. Accordingly, not only the first peak information but also statistical information relating to high order peaks can be utilized for a certain extraction.

FIG. 8 is a graph of the first peak information, in which the standard deviation is used as a threshold when each frame is updated by one point while passing through voice in the case that frames having a length of 512 points are used as a default frame, in which the segment of each phoneme is indicated by a boundary. That is, the boundary to determine the position where the phoneme is segmented is demarcated at a valley between dominant maxima after finding the dominant maxima.

Further, the peak measurement information according to each phoneme is shown as the valley between the dominant maxima as shown in FIG. 8A, and can be utilized for recognition of the phoneme when each valley is regarded as a phoneme. Specifically, when it is analyzed which phoneme a region between the valleys corresponds to, the recognition of the phoneme can be easily achieved. According to the present invention, the starting point and the ending point of each phoneme can be divided by determining the valley between the maxima as the boundary, thereby making it possible to distinguish the differences between all the phonemes.

As described above, when the phoneme segmentation method according to the present invention is used, there is an advantage in that the phoneme segmentation can be further accurately performed, in comparison with the method for segmenting the phonemes by a block unit. Furthermore, since the peak information extraction used in the present invention is performed by only an integer operation, round-off errors occurring in the add calculation of a floating point algorithm can be prevented. In addition, the first peak extraction is performed by a very simple calculation in which two comparison operations are carried out in both data points. The high order peak extraction for extracting a high order peak having an order greater than second order also is carried out by the same comparison operation, excepting the input data of peaks. They have an advantage of having the small amount of calculation.

Further, the present invention can solve the problems occurring when conventional methods are carried out in consideration of signals, a system, and an operation circumstance, and has an advantage of being used for various systems without a separate assumption because of the small amount of computational load.

Further, the phoneme segmentation method according to the present invention has a generality and a utility in that it can be applied to a system using all sound signals (sound recognition, sound cording, sound synthesizing, sound reinforcement, etc.), and is the original technique which can be applied to a system using all sound signals in order to perform the phoneme segmentation of the voice signals.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for segmenting phonemes from voice signals, comprising:
    extracting peak information from input voice signals, the peak information including first peak information corresponding to a plurality of first order peaks of the input voice signals and second peak information corresponding to a plurality of second order peaks for the plurality of first order peaks;
    determining a length of a frame for calculating peak statistics;
    forming a histogram showing a density distribution of the second order peaks with respect to the determined frame length;
    calculating the peak statistics using the histogram;
    determining two neighboring maxima of the histogram using the calculated peak statistics per each frame; and
    determining a valley between the two neighboring maxima as a boundary between phonemes to perform a phoneme segmentation;
    wherein the method further comprises:
    extracting the peak information from voice signals on a time domain;
    defining a peak order with respect to the extracted peak information;
    comparing a peak measurement value of the defined peak order with a predetermined critical peak measurement value; and
    determining a present peak order as a final peak order, which is used to extract the second peak information, when the peak measurement value is greater than the critical peak measurement value.

2. The method as claimed in claim 1, further comprising repeating the determination of the present peak order unless the peak measurement value of the defined peak order is greater than the critical peak measurement value after the present peak order is allowed to increase, to define a novel peak order when the peak measurement value is below the critical peak measurement value, and a peak measurement value of the novel peak order is compared with the critical peak measurement value.

3. A system for segmenting phonemes from voice signals, comprising:

a peak information extractor for extracting peak information from input voice signals, the peak information including first peak information corresponding to a plurality of first order peaks of the input voice signals and second peak information corresponding to a plurality of second order peaks from among the plurality of first order peaks;

a peak statistic calculator for determining a length of a frame for calculating peak statistics and calculating the peak statistics using a histogram;

a boundary determination unit for determining two neighboring maxima of the histogram using the calculated peak statistics per each frame, and determining a valley between the two neighboring maxima as a boundary between the phonemes in order to segment the phonemes;

a frame length determination unit for determining a length of a frame to calculate the peak statistics; and a histogram forming unit for forming the histogram showing a density distribution of the second order peaks with respect to the determined frame length;

wherein the system further comprises:

a peak order determination unit for extracting peak information on voice signals on a time domain, defining a peak order with respect to the extracted peak information, comparing a peak measurement value of the defined peak order with a predetermined critical peak measurement value, and determining a present peak order as a final peak order, which is used to extract the second peak information, when the peak measurement value is greater than the critical peak measurement value.

4. The system as claimed in claim 3, wherein the peak order determination unit increases the present peak order so as to define a novel peak order when the peak measurement value is below the critical peak measurement value, and then compares a peak measurement value of the novel peak order with the critical peak measure value, to determine the peak order when the novel peak measurement value is smaller than the critical peak measurement value.

* * * * *